US011621577B2

(12) United States Patent
Deng

(10) Patent No.: US 11,621,577 B2
(45) Date of Patent: Apr. 4, 2023

(54) PHOTOVOLTAIC BLUETOOTH HEADSET COMPARTMENT

(71) Applicant: GUANGDONG XIZHONGXI TECHNOLOGY CO., LTD., Dongguan (CN)

(72) Inventor: Xiuhong Deng, Shenzhen (CN)

(73) Assignee: GUANGDONG XIZHONGXI TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 17/504,608

(22) Filed: Oct. 19, 2021

(65) Prior Publication Data
US 2023/0070952 A1 Mar. 9, 2023

(30) Foreign Application Priority Data
Sep. 6, 2021 (CN) .......................... 202122147713.9

(51) Int. Cl.
*H02J 7/00* (2006.01)
*H02J 7/35* (2006.01)
*H01R 33/955* (2006.01)
*H04R 1/10* (2006.01)
*H02S 40/38* (2014.01)

(52) U.S. Cl.
CPC .............. *H02J 7/35* (2013.01); *H01R 33/955* (2013.01); *H02J 7/0042* (2013.01); *H02J 7/0048* (2020.01); *H02S 40/38* (2014.12); *H04R 1/1025* (2013.01)

(58) Field of Classification Search
CPC ......................................................... H02J 7/35
See application file for complete search history.

(56) References Cited

U.S. PATENT DOCUMENTS

| 10,129,626 | B1 * | 11/2018 | Jung ....................... H02J 7/342 |
| 10,904,673 | B1 * | 1/2021 | Zhang ................... H04R 25/602 |
| 2018/0091885 | A1 * | 3/2018 | Carter ................... H02J 7/0044 |
| 2020/0266640 | A1 * | 8/2020 | Valenzuela ........... H02J 7/0044 |

* cited by examiner

*Primary Examiner* — Robert Grant

(57) ABSTRACT

A photovoltaic Bluetooth headset compartment is provided, comprising: a bottom shell, an upper cover flip-connected with the bottom shell, an inner support assembled on the bottom shell, a photovoltaic panel assembled on an outside of the upper cover, a circuit board assembled in the bottom shell and, a storage battery assembled in the bottom shell and electrically connected to the circuit board, wherein the upper cover is provided with a first spring pin of which one end is electrically connected to the photovoltaic panel and the other end extends from the upper cover, and the inner support is provided with a spring pin contact point electrically connected to the circuit board; and after the upper cover is closed, the first spring pin is inserted into a spring pin contact point and the photovoltaic panel charges the storage battery.

7 Claims, 4 Drawing Sheets

PHOTOVOLTAIC BLUETOOTH HEADSET COMPARTMENT

FIELD OF THE DISCLOSURE

The present disclosure relates to the technical field of a Bluetooth headset compartment; in particular, to a photovoltaic Bluetooth headset compartment.

BACKGROUND OF THE DISCLOSURE

The Bluetooth headset is the application of Bluetooth technology to the hands-free headset, so that users can avoid the annoying wires and make calls easily in various ways. Since the advent of Bluetooth headsets, it has always been a good tool for mobile business people to improve efficiency.

The Bluetooth headset compartment is used to charge the Bluetooth headset, but the storage battery in the headset compartment can only charge the Bluetooth headset 3-4 times, and it needs to be recharged. However, it often happens that the user forgets to charge the headset compartment or needs to be outdoors for a long time. How to solve the battery life problem of Bluetooth headset has become a problem to be solved.

SUMMARY OF THE DISCLOSURE

The purpose of the present disclosure is to provide a photovoltaic Bluetooth headset compartment aiming at the defects and deficiencies of the prior art, which has the advantages of strong battery life, energy saving, and high safety performance.

In order to achieve the above purpose, the technical solution adopted by the present disclosure is to provide a photovoltaic Bluetooth headset compartment, comprising: a bottom shell, an upper cover flip-connected with the bottom shell, an inner support assembled on the bottom shell, a photovoltaic panel assembled on an outside of the upper cover, a circuit board assembled in the bottom shell and a storage battery assembled in the bottom shell and electrically connected to the circuit board, wherein the upper cover is provided with a first spring pin of which one end is electrically connected to the photovoltaic panel and the other end extends from the upper cover, and the inner support is provided with a spring pin contact point electrically connected to the circuit board; and after the upper cover is closed, the first spring pin is inserted into a spring pin contact point and the photovoltaic panel charges the storage battery.

In a preferred embodiment, an outside of the bottom shell or an outside of the upper cover is provided with an inner concave space, and the inner concave space is provided with a connecting column that is flush with the outside of the bottom shell or the outside of the upper cover.

In a preferred embodiment, the connecting column is connected with a lanyard.

In a preferred embodiment, the bottom shell is provided with a display tube electrically connected to the circuit board and configured to display a remaining power of the storage battery.

In a preferred embodiment, the bottom shell is provided with a first magnet and the inner support is provided with a second magnet attractable to the first magnet.

In a preferred embodiment, the bottom shell is provided with a charging port electrically connected to the circuit board.

In a preferred embodiment, the inner support is provided with two headset receiving grooves, and each of the headset receiving grooves is provided with a second spring pin electrically connected to the circuit board.

After adopting the above technical scheme, the beneficial effects of the present disclosure are as follows.

1. In the present disclosure, the photovoltaic panel, the storage battery, the first spring pin and the spring pin contact point are provided, so that after the upper cover and the bottom shell are closed, the first spring pin is inserted into the spring pin contact point, and then the photovoltaic panel is connected to the storage battery. When the light conditions are sufficient, the photovoltaic panel charges the storage battery, which has strong endurance and saves energy, and when the upper cover is opened, because the first spring pin is far away from the spring pin contact point, the photovoltaic panel stops charging the storage battery, so that the user will not accidentally touch and be dangerous, and the safety performance is high.

2. In the present disclosure, an outside of the bottom shell or an outside of the upper cover is provided with a concave space, and the inner concave space is provided with a connecting column that is flush with the outside of the bottom shell or the outside of the upper cover, so that the photovoltaic Bluetooth headset compartment can be hung on the backpack by a lanyard or hung on the keychain. When doing outdoor activities, the photovoltaic Bluetooth headset compartment can be directly contacted with the outside world whether it is hung on the backpack or hung from the trousers through the keychain for charging, and then can be charged; in addition, since the connecting column is arranged in the concave space and is flush with the outside of the bottom shell or the outside of the upper cover, it will not be scratched with foreign objects during storage or carrying.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are just some embodiments of the present disclosure. For those of ordinary skill in the art, other drawings can be obtained based on these drawings without creative labor.

Figure 1:
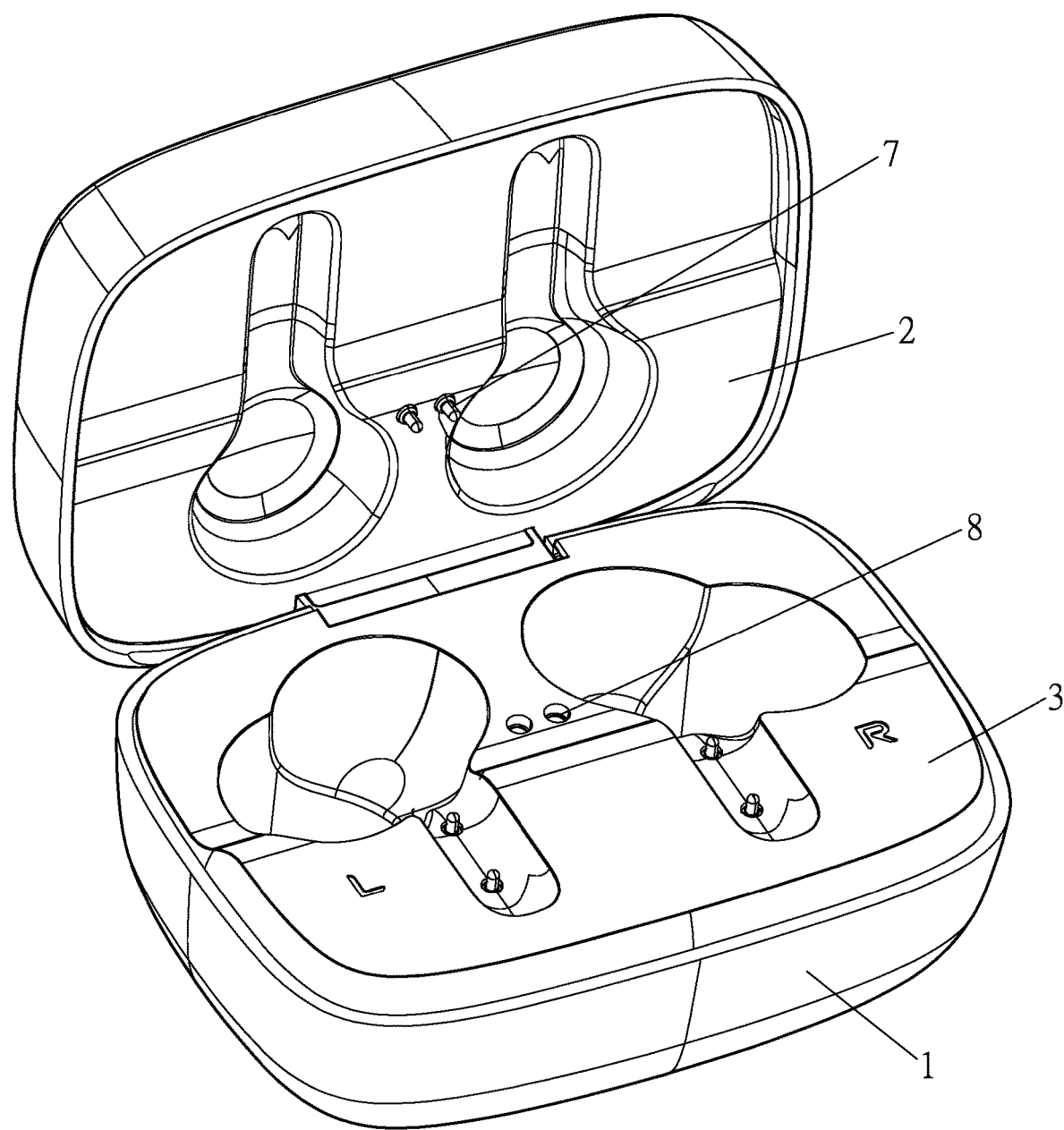
FIG. 1 is a structural schematic diagram of the disclosure with the upper cover opened relative to the bottom shell.

Reference Numeral: 1. bottom shell; 2. upper cover; 3. inner support; 4. photovoltaic panel; 5. circuit board; 6. storage battery; 7. first spring pin; 8. spring pin contact point; a. inner concave space; 9. connecting column; 10. display tube; 11. first magnet; 12. second magnet; 13. charging port; 14. headset receiving groove; 15. second spring pin.

DETAILED DESCRIPTION OF THE EXEMPLARY EMBODIMENTS

Hereinafter, the present disclosure will be further described in detail with reference to the accompanying drawings.

This specific embodiment is only an explanation of the present disclosure, and it is not a limitation of the present disclosure. After reading this specification, those skilled in the art can make modifications to this embodiment that do not create any contribution as needed, but as long as the present disclosure is used, the scope of claims of the present disclosure is protected by the patent law.

Figure 2:
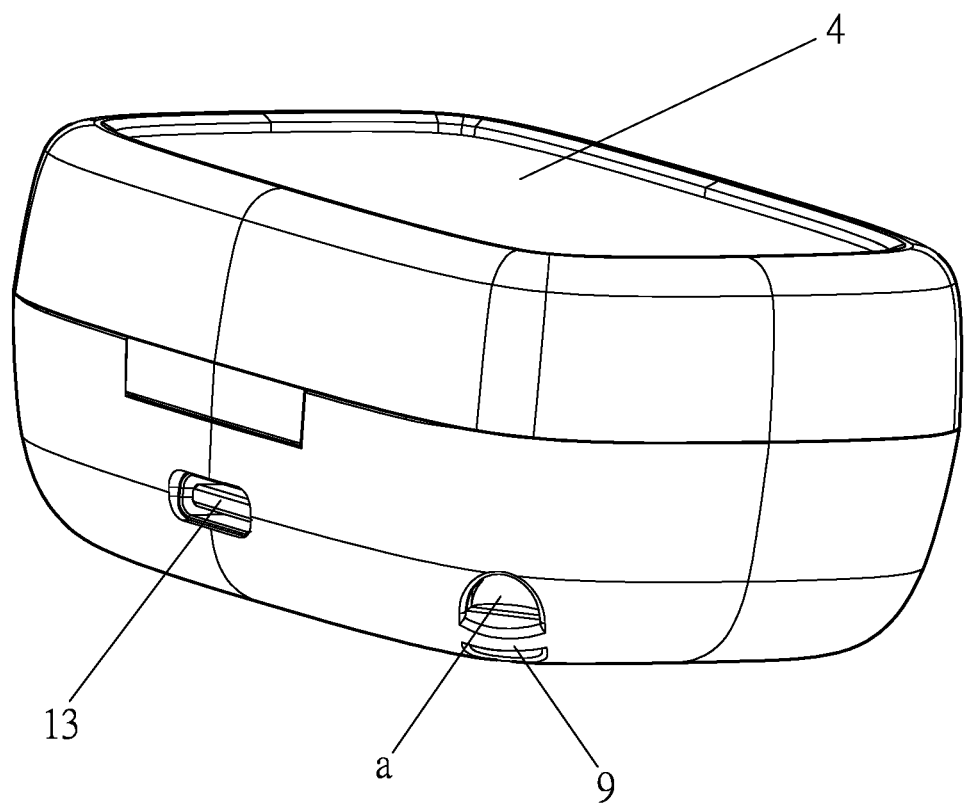
FIG. 2 is a schematic view of the structure of the upper cover and the bottom shell of the present disclosure.

The present embodiment is related to a photovoltaic Bluetooth headset compartment, as shown in FIG. 1 and FIG. 2, comprising: a bottom shell 1, an upper cover 2 flip-connected with the bottom shell 1, an inner support 3 assembled on the bottom shell 1, a photovoltaic panel 4 assembled on an outside of the upper cover 2, a circuit board 5 assembled in the bottom shell 1 and a storage battery 6 assembled in the bottom shell 1 and electrically connected to the circuit board 5. As the most important improvement of the present disclosure, the upper cover 2 is provided with a first spring pin 7 of which one end is electrically connected to the photovoltaic panel 4 and the other end extends from the upper cover 2, and the inner support 3 is provided with a spring pin contact point 8 electrically connected to the circuit board 5; and after the upper cover 2 is closed, the first spring pin 7 is inserted into a spring pin contact point 8 and the photovoltaic panel 4 charges the storage battery 6. When the light conditions are sufficient, the photovoltaic panel 4 charges the storage battery 6, which has strong endurance and saves energy, and when the upper cover 2 is opened, because the first spring pin 7 is far away from the spring pin contact point 8, the photovoltaic panel 4 stops charging the storage battery 6, so that the user will not accidentally touch and be dangerous, and the safety performance is high.

As another important improvement of the present disclosure, as shown in FIG. 2, an outside of the bottom shell 1 or an outside of the upper cover 2 is provided with a concave space a, and the inner concave space a is provided with a connecting column 9 that is flush with the outside of the bottom shell 1 or the outside of the upper cover 2, and the connecting column 9 is connected with a lanyard (not shown), so that the photovoltaic Bluetooth headset compartment can be hung on the backpack by a lanyard or hung on the keychain. When doing outdoor activities, the photovoltaic Bluetooth headset compartment can be directly contacted with the outside world whether it is hung on the backpack or hung from the trousers through the keychain for charging, and then can be charged; in addition, since the connecting column 9 is arranged in the concave space a and is flush with the outside of the bottom shell 1 or the outside of the upper cover 2, it will not be scratched with foreign objects during storage or carrying.

Figure 3:
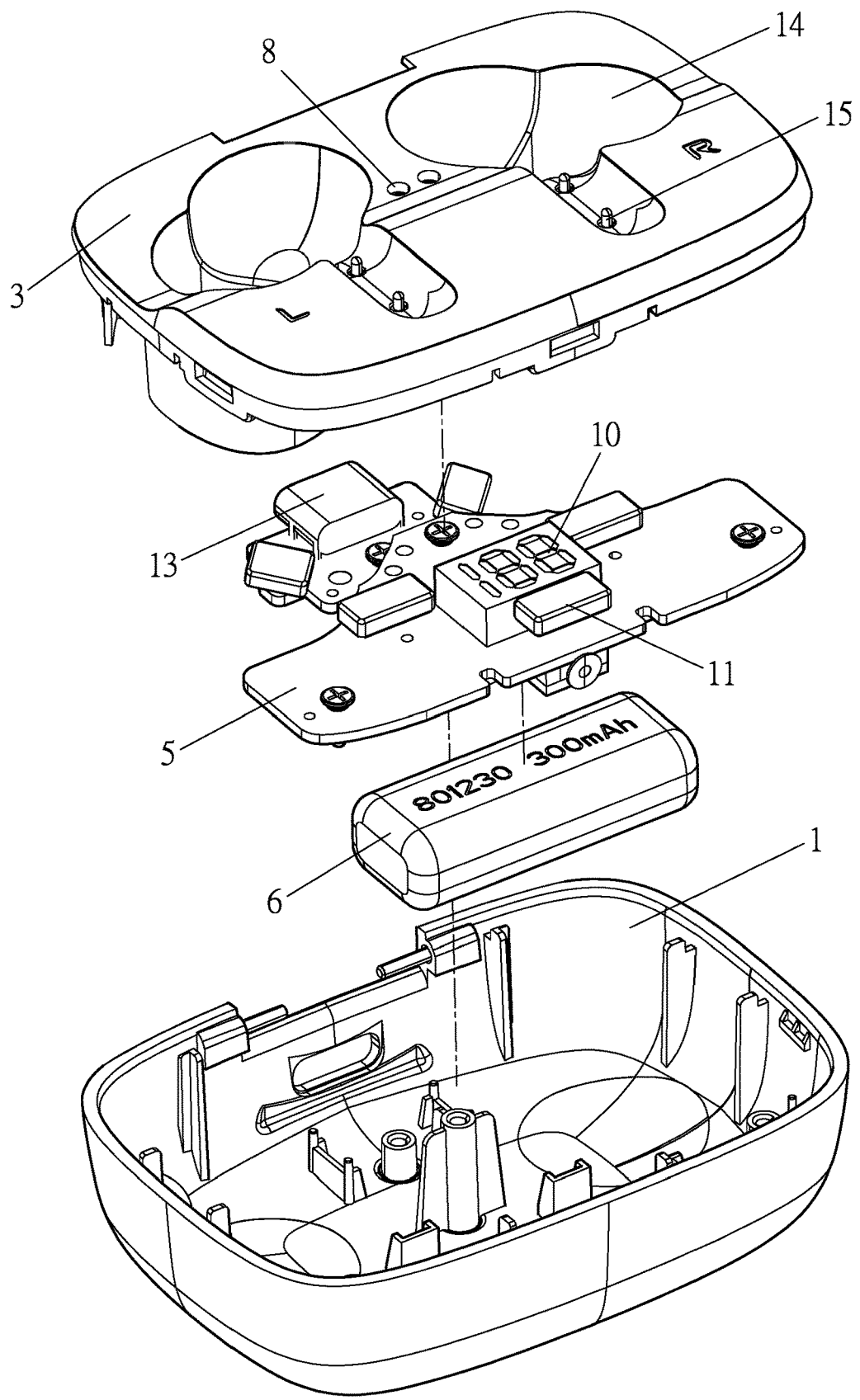
FIG. 3 is an exploded schematic diagram of the structure of the bottom shell of the present disclosure.

As shown in FIG. 3, the bottom shell 1 is provided with a display tube 10 electrically connected to the circuit board 5 and configured to display a remaining power of the storage battery 6. The number of the display tube 10 can be displayed on the inner support 3. After the user opens the upper cover 2, according to the number displayed on the display tube 10, the remaining power can be known in real time.

Figure 4:
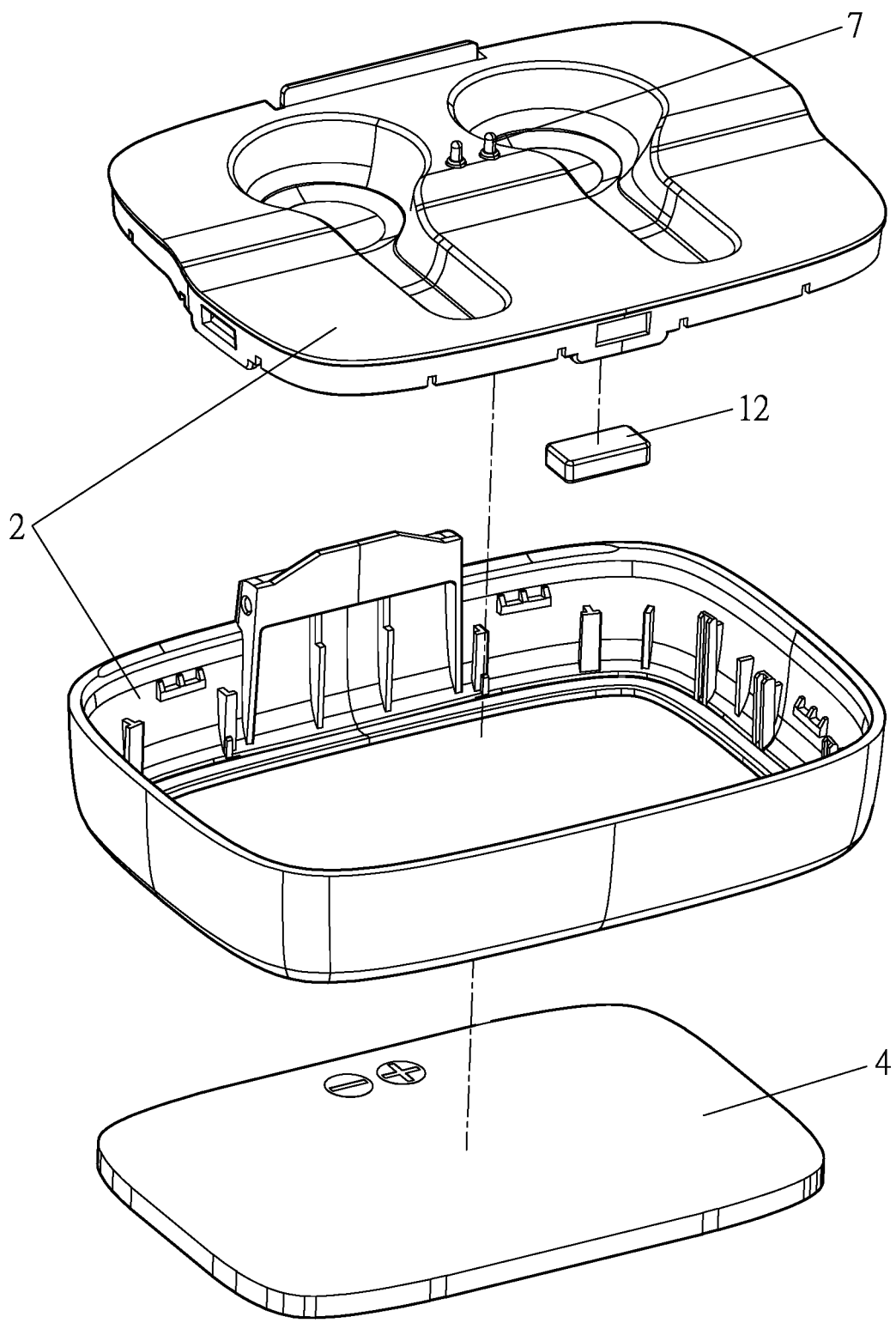
FIG. 4 is an exploded view of the structure of the upper cover of the present disclosure.

In addition, as shown in FIG. 3 and FIG. 4, the bottom shell 1 is provided with a first magnet 11 and the inner support 3 is provided with a second magnet 12 attractable to the first magnet 11. The two magnets are attractable to each other so that the upper cover 2 will not fall out easily after being closed.

As shown in FIG. 2, the bottom shell 1 is provided with a charging port 13 electrically connected to the circuit board 5. In addition to the photovoltaic panel 4 charging the storage battery 6, the photovoltaic Bluetooth headset compartment can also charge the storage battery 6 after an external power source is connected to the charging port 13.

As shown in FIG. 3, the inner support 3 is provided with two headset receiving grooves 14, and each of the headset receiving grooves 14 is provided with a second spring pin 15 electrically connected to the circuit board 5.

The working principle of the present disclosure is roughly as follows. By providing the photovoltaic panel 4, the storage battery 6, the first spring pin 7 and the spring pin contact point 8, the first spring pin 7 is inserted into the spring pin contact point 8 after the upper cover 2 is closed with the bottom shell 1, and then the photovoltaic panel 4 and the storage battery 6 are connected. When the light conditions are sufficient, the photovoltaic panel 4 charges the storage battery 6, which has strong endurance and saves energy, and when the upper cover 2 is opened, because the first spring pin 7 is far away from the spring pin contact point 8, the photovoltaic panel 4 stops charging the storage battery 6, so that the user will not accidentally touch and be dangerous, and the safety performance is high.

The above-mentioned descriptions represent merely an exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A photovoltaic Bluetooth headset compartment, comprising:
   a bottom shell;
   an upper cover flip-connected with the bottom shell; an inner support assembled on the bottom shell;
   a photovoltaic panel assembled on an outside of the upper cover;
   a circuit board assembled in the bottom shell; and
   a storage battery assembled in the bottom shell and electrically connected to the circuit board,
   wherein the upper cover is provided with a first spring pin of which one end is electrically connected to the photovoltaic panel and the other end extends from the upper cover, and the inner support is provided with a spring pin contact point electrically connected to the circuit board, and
   wherein, after the upper cover is closed, the first spring pin is inserted into a spring pin contact point and the photovoltaic panel charges the storage battery;
   when the upper cover is opened, the first spring pin is far away from the spring pin contact point, and the photovoltaic panel stops charging the storage battery;
   wherein an outside of the bottom shell or an outside of the upper cover is provided with an inner concave space, and the inner concave space is provided with a connecting column that is flush with the outside of the bottom shell or the outside of the upper cover.

2. The photovoltaic Bluetooth headset compartment according to claim 1, wherein the connecting column is connected with a lanyard.

3. The photovoltaic Bluetooth headset compartment according to claim 1, wherein the bottom shell is provided with a display tube electrically connected to the circuit board and configured to display a remaining power of the storage battery.

4. The photovoltaic Bluetooth headset compartment according to claim 1, wherein the bottom shell is provided with a first magnet and the inner support is provided with a second magnet attractable to the first magnet.

5. The photovoltaic Bluetooth headset compartment according to claim 1, wherein the bottom shell is provided with a charging port electrically connected to the circuit board.

6. The photovoltaic Bluetooth headset compartment according to claim 1, wherein the inner support is provided with two headset receiving grooves and each of the headset receiving grooves is provided with a second spring pin electrically connected to the circuit board.

7. The photovoltaic Bluetooth headset compartment according to claim 1, wherein the inner concave space located outside of the bottom shell or an outside of the upper cover is a blind concave.

* * * * *